(12) United States Patent
Quinones

(10) Patent No.: US 9,388,546 B2
(45) Date of Patent: Jul. 12, 2016

(54) OIL RECOVERY SYSTEM

(71) Applicant: Victor Manuel Quinones, San Antonio, TX (US)

(72) Inventor: Victor Manuel Quinones, San Antonio, TX (US)

(\*) Notice: Subject to any disclaimer, the term of this patent is extended or adjusted under 35 U.S.C. 154(b) by 210 days.

(21) Appl. No.: 14/321,750

(22) Filed: Jul. 1, 2014

(65) Prior Publication Data

US 2015/0027939 A1    Jan. 29, 2015

Related U.S. Application Data

(60) Provisional application No. 61/859,128, filed on Jul. 26, 2013.

(51) Int. Cl.
| | |
|---|---|
| *E02B 15/04* | (2006.01) |
| *B65G 17/02* | (2006.01) |
| *F16G 15/12* | (2006.01) |
| *E02B 15/10* | (2006.01) |
| *B65G 17/44* | (2006.01) |

(52) U.S. Cl.
CPC ............. *E02B 15/104* (2013.01); *B65G 17/02* (2013.01); *B65G 17/44* (2013.01); *E02B 15/045* (2013.01); *E02B 15/046* (2013.01); *F16G 15/12* (2013.01)

(58) Field of Classification Search
CPC ... E02B 15/045; E02B 15/046; E02B 15/104; B65G 17/02; B65G 17/38; B65G 17/42; B65G 17/44; F16G 13/07; F16G 13/18; F16G 15/12; F16G 15/14
USPC ............... 210/170.05, 170.09, 170.11, 242.3, 210/923; 198/849; 474/206, 226, 228, 230
See application file for complete search history.

(56) References Cited

U.S. PATENT DOCUMENTS

| | | | | |
|---|---|---|---|---|
| 971,454 | A | * | 9/1910 | Levalley ................ B65G 17/38 474/231 |
| 1,475,382 | A | | 11/1923 | Gennevois |
| 1,771,411 | A | * | 7/1930 | Lee .......................... B65G 17/38 198/710 |
| 1,843,208 | A | * | 2/1932 | Cutler .................... B65G 17/02 198/849 |
| 2,053,322 | A | * | 9/1936 | Cavagnaro .............. F26B 17/04 198/849 |
| 3,314,540 | A | | 4/1967 | Lane |
| 3,617,552 | A | | 11/1971 | Will et al. |
| 3,643,804 | A | | 2/1972 | Sharpton |
| 3,670,896 | A | | 6/1972 | Hale, Jr. et al. |
| 3,947,360 | A | | 3/1976 | Fast |
| 3,968,041 | A | | 7/1976 | De Voss |

(Continued)

FOREIGN PATENT DOCUMENTS

| | | | |
|---|---|---|---|
| JP | 11-247064 | | 9/1999 |
| WO | WO 2011/007976 | * | 1/2011 |

(Continued)

*Primary Examiner* — Christopher Upton
(74) *Attorney, Agent, or Firm* — Richard C. Litman

(57) ABSTRACT

The oil recovery system is used to remove oil from water. The system includes rollers rotatably supported on a frame, one of the rollers having drive sprockets. A belt extends between the first and second rollers and a roller press squeezes the belt to thereby remove oil from the belt. The belt has a first layer of oleophilic material, a second layer of oleophilic material and a third central reinforcing scrim layer between the first and second layer. Chains extend along the side edges of the belt, and are driven by the sprockets. The chains are connected to the side edges by a plurality of flanges that are integral the chains, reinforcing cords extending along the side edges, reinforcing strips wrapped around the reinforcing cords and extending along the side edges, and a plurality of pins that extend through the flanges, the strip and the three layers.

16 Claims, 9 Drawing Sheets

(56) References Cited

U.S. PATENT DOCUMENTS

| | | | |
|---|---|---|---|
| 3,980,559 A | 9/1976 | Netzell | |
| 4,006,079 A | 2/1977 | Langlois et al. | |
| 4,165,282 A | 8/1979 | Bennett et al. | |
| 4,341,637 A | 7/1982 | Smith | |
| 4,832,852 A | 5/1989 | Wells et al. | |
| 5,022,987 A | 6/1991 | Wells | |
| 5,084,171 A | 1/1992 | Murphy et al. | |
| 5,114,787 A | 5/1992 | Chaplin et al. | |
| 5,173,182 A | 12/1992 | Debellian | |
| 5,362,391 A | 11/1994 | Stephens | |
| 5,730,868 A | 3/1998 | Cordani | |
| 5,743,694 A | 4/1998 | Hines | |
| 5,753,108 A | 5/1998 | Haynes et al. | |
| 5,885,451 A | 3/1999 | Porrovecchio, Sr. | |
| 5,921,399 A * | 7/1999 | Bakula | B01D 33/04 210/400 |
| 6,146,529 A | 11/2000 | McCrory | |
| 6,190,570 B1 * | 2/2001 | Nakamura | E02B 15/104 210/242.3 |
| 2002/0157927 A1 * | 10/2002 | Takeno | B62D 55/20 198/849 |
| 2007/0272522 A1 * | 11/2007 | Kuo | B65G 17/02 198/849 |
| 2009/0137177 A1 | 5/2009 | Jonker | |
| 2010/0275833 A1 * | 11/2010 | Jarvinen | B63B 35/32 114/343 |
| 2011/0233149 A1 * | 9/2011 | Hines | E02B 15/046 210/242.3 |
| 2011/0303613 A1 | 12/2011 | Crouse | |
| 2012/0012535 A1 * | 1/2012 | Taylor | E02B 15/104 210/242.3 |
| 2012/0085709 A1 | 4/2012 | Packham | |
| 2012/0111792 A1 | 5/2012 | Lu | |

FOREIGN PATENT DOCUMENTS

| | | |
|---|---|---|
| WO | WO 2012/006424 A1 | 1/2012 |
| WO | WO 2012/032442 A1 | 3/2012 |

* cited by examiner

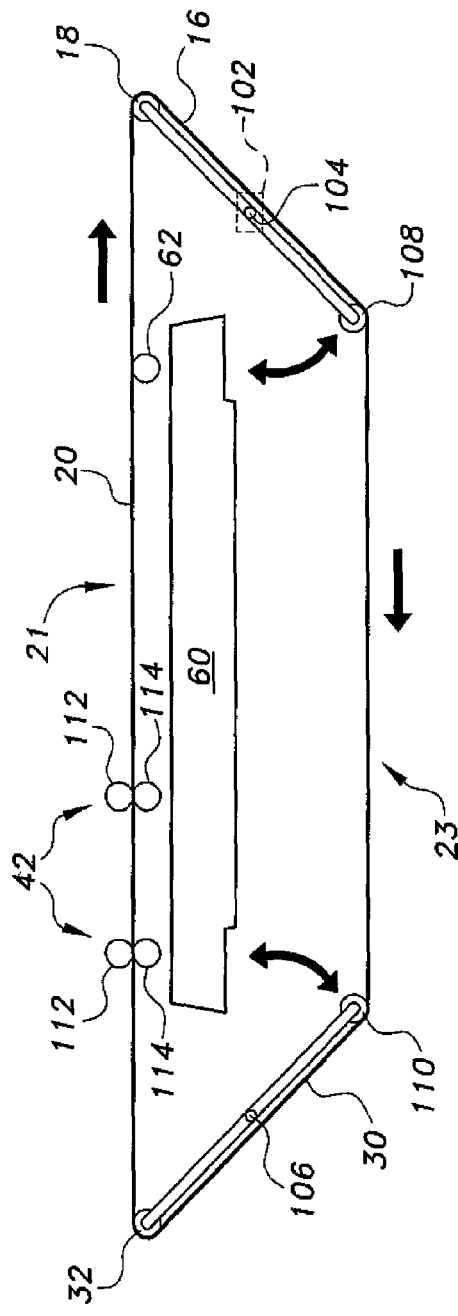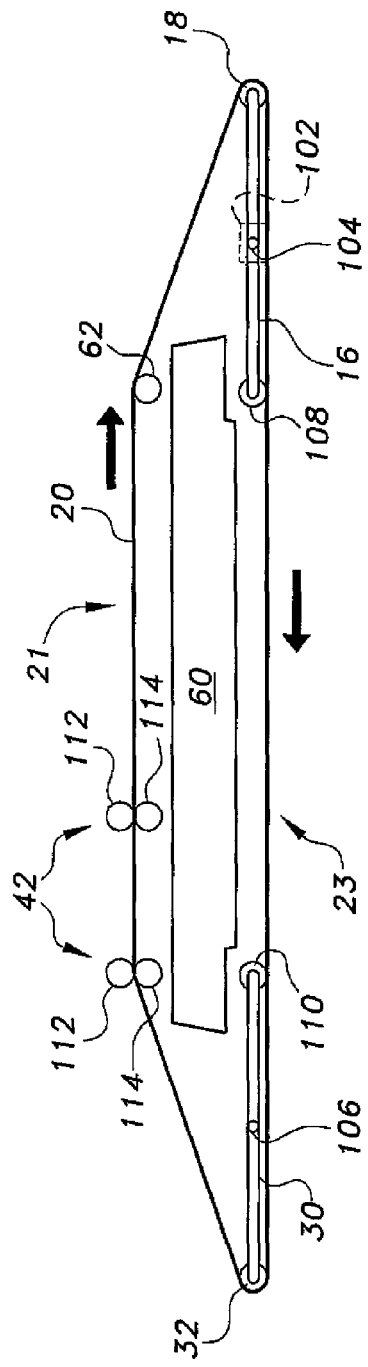

OIL RECOVERY SYSTEM

CROSS-REFERENCE TO RELATED APPLICATION

This application claims the benefit of U.S. Provisional Patent Application Ser. No. 61/859,128, filed Jul. 26, 2013, which is incorporated by reference herein.

FIELD OF THE INVENTION

The present invention relates to environmental cleanup of oil spills, and particularly to an oil recovery system for removing oil from a body of water.

DESCRIPTION OF THE RELATED ART

Oil spills at sea, in lakes, rivers, harbors, marinas, coastal areas and the like are a serious environmental hazard. Wildlife, marine life and coastal welfare, in addition to commercial businesses, are at risk with each and every incident. In responding to an oil spill, critical factors are speed of response and operational efficiency. These factors tend to favor the use of small skimmer-equipped vessels and portable oil recovery systems that can be rapidly transported to the area of an oil spill, and that can work in multiple environments (lakes, rivers, harbors and other inshore and offshore locations). Although the ability to transport such a skimmer is of great importance, the overall efficiency and speed of the cleanup operation is also critical. With present skimmers, the portability of the system, which typically translates into decreased system size, contrasts against the overall power and efficiency of the system. It would be desirable to provide a portable oil recovery system with the speed and efficiency of a large-scale oil recovery plant and the portability and size of a conventional skimmer.

In addition to operational speed, the limited oil storage capacity of many of the current types of small oil spill recovery vessels requires a periodic halt in operation to allow transfer of recovered oil either to another ship or to a land-based facility. Increasing the size of a vessel's onboard oil storage tanks has the disadvantage of increasing fuel costs and limiting operational range. Furthermore, the use of deck-carried oil storage bladders or tanks has an adverse effect on stability, which can pose a significant risk at sea, Further, although modern skimming equipment is relatively efficient, a small percentage of water is still picked up with the recovered oil. Storage of this water along with the recovered oil represents a reduction in oil storage capacity and increased fuel costs, that is, a reduction of operational efficiency.

Thus, an oil recovery system solving the aforementioned problems is desired.

SUMMARY OF THE INVENTION

An oil recovery system can be used for removing an oil spill from the surface of a body of water, The oil recovery system includes a frame, a first and second frame roller rotatably supported on the frame, a belt extending between the first and second frame rollers, and a press roller that squeezes or presses against opposing surfaces of the belt to remove oil from the belt. The press roller includes at least one roller having a sprocket mounted thereon. The belt has first and second side edges and includes a first layer of oleophilic material, a second layer of oleophilic material, a third central reinforcing scrim layer between the first and second layer, a chain extending along at least one of the side edges of the belt, and a connection system that connects the chain to the side edge. The chain can be driven by the sprocket.

The connecting system includes a plurality of flanges extending from the chain to a side edge of the belt, a reinforcing cord disposed along the side edge, and a reinforcing strip wrapped around the reinforcing cord and attached to the side edge, and a plurality of pins each extending through a corresponding flange of the plurality of flanges, the strip and the three layers of the belt.

In a further embodiment, an oil recovery vessel is provided for removing an oil spill from the surface of a body of water. The vessel includes a front frame corresponding to a front portion of the vessel and a rear frame corresponding to a rear portion of the vessel. The front frame includes an upper roller and a submersible roller, which are rotatably supported on the front frame. The rear frame includes an upper roller and a submersible roller, which are rotatably supported on the rear frame. A belt extends between the front and rear frames. At least one sprocket is mounted to at least one roller. At least one roller press is provided to squeeze the belt or press against opposing surfaces of the belt to remove oil from the belt. The connection system is used to connect the belt to the chain.

These and other features of the present invention will become readily apparent upon further review of the following specification and drawings.

RIEF DESCRIPTION OF THE DRAWINGS

Figure 1:
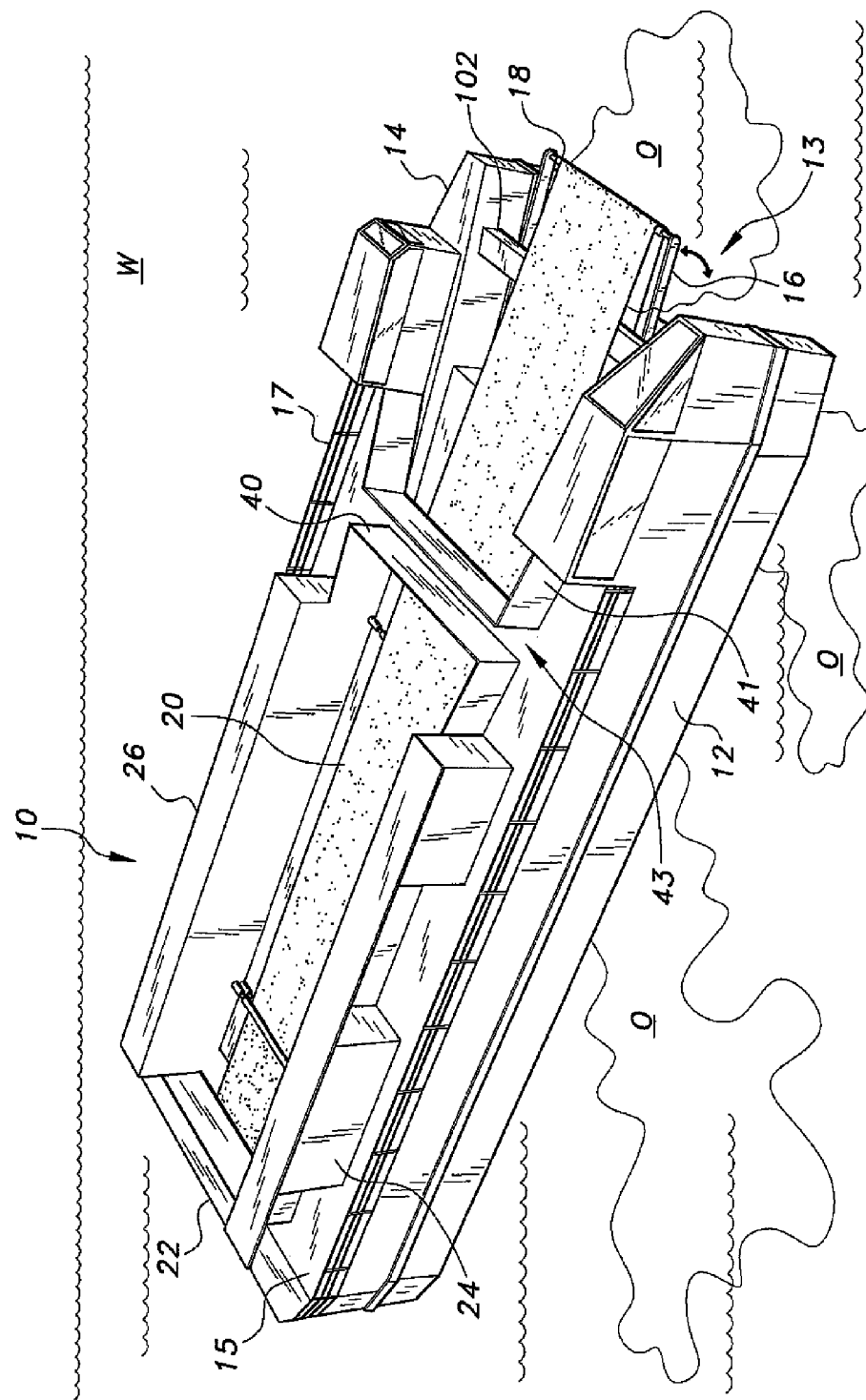
FIG. 1 is an environmental, perspective view of an oil recovery vessel according to the present invention.
Figure 3:
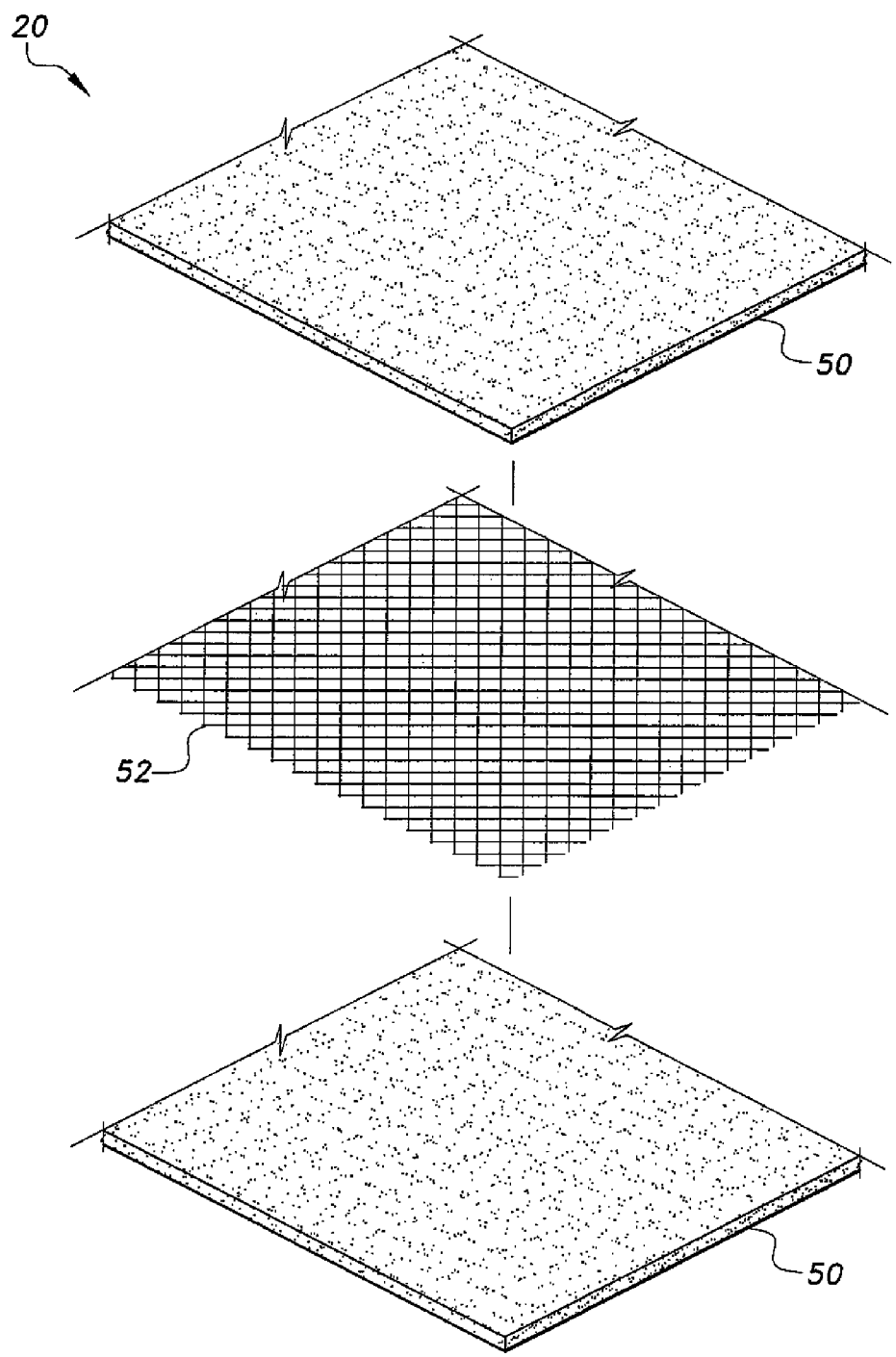

FIG. 3 an exploded perspective view of an oil adsorbent fabric used in the continuous belt of the oil recovery vessel of FIG. 1.

FIG. 4A is a diagrammatic side view of the roller belt system of the oil recovery vessel of FIG. 1, showing the belt lowered for the collection of oil from the surface of the water.

FIG. 4B is a diagrammatic side view of the roller belt system of the oil recovery vessel of FIG. 1, showing the belt raised when not in use.

Figure 2:
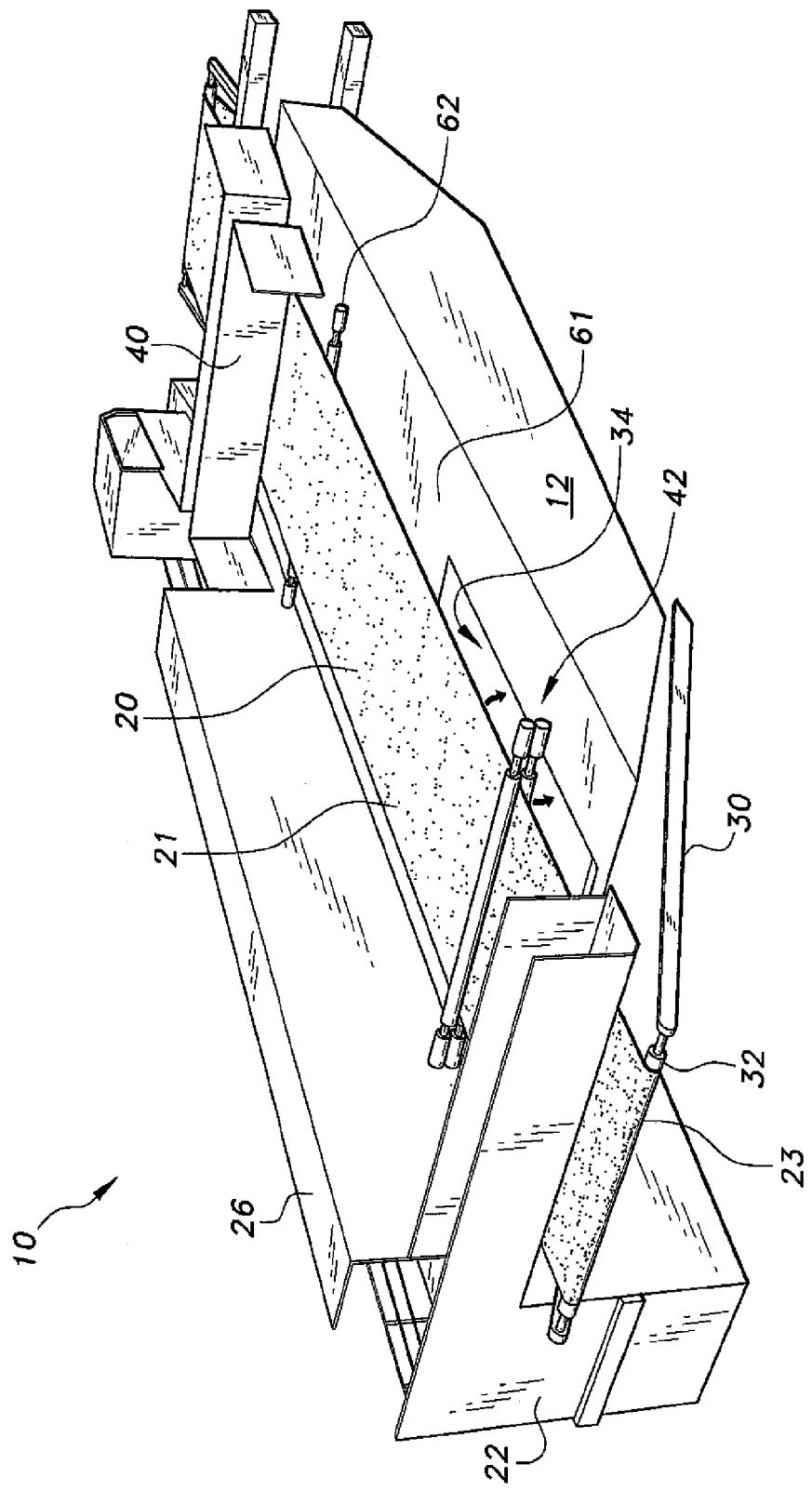
FIG. 2 is a perspective view of the oil recovery vessel of FIG. 1 as seen from the right rear of the vessel, the starboard hull being removed to show details thereof.
Figure 2A:
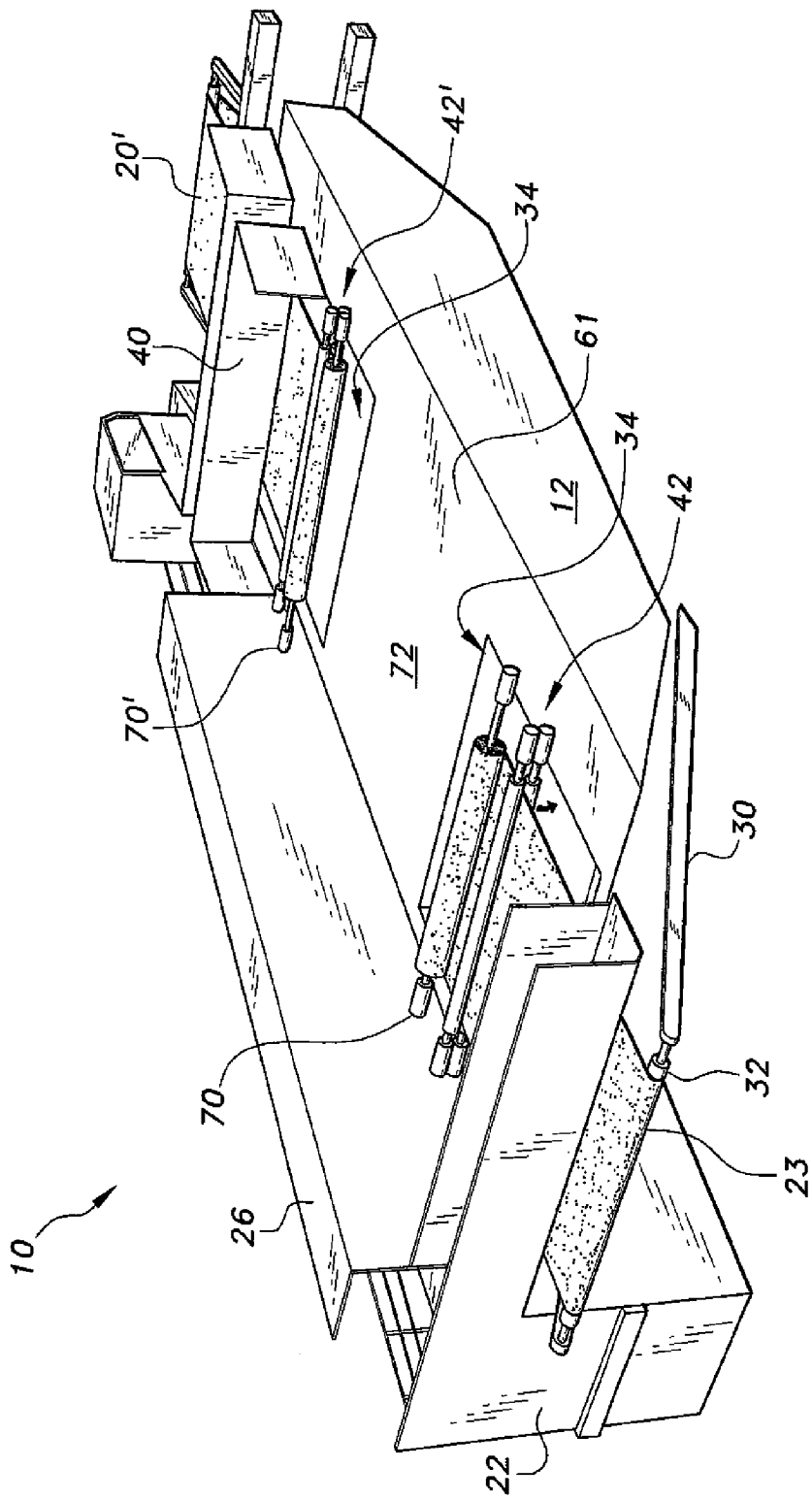
FIG. 2A is a perspective view of a further embodiment of the oil recovery vessel of FIG. 1 as seen from the right rear of the vessel, the starboard hull being removed to show details thereof.
Figure 4C:
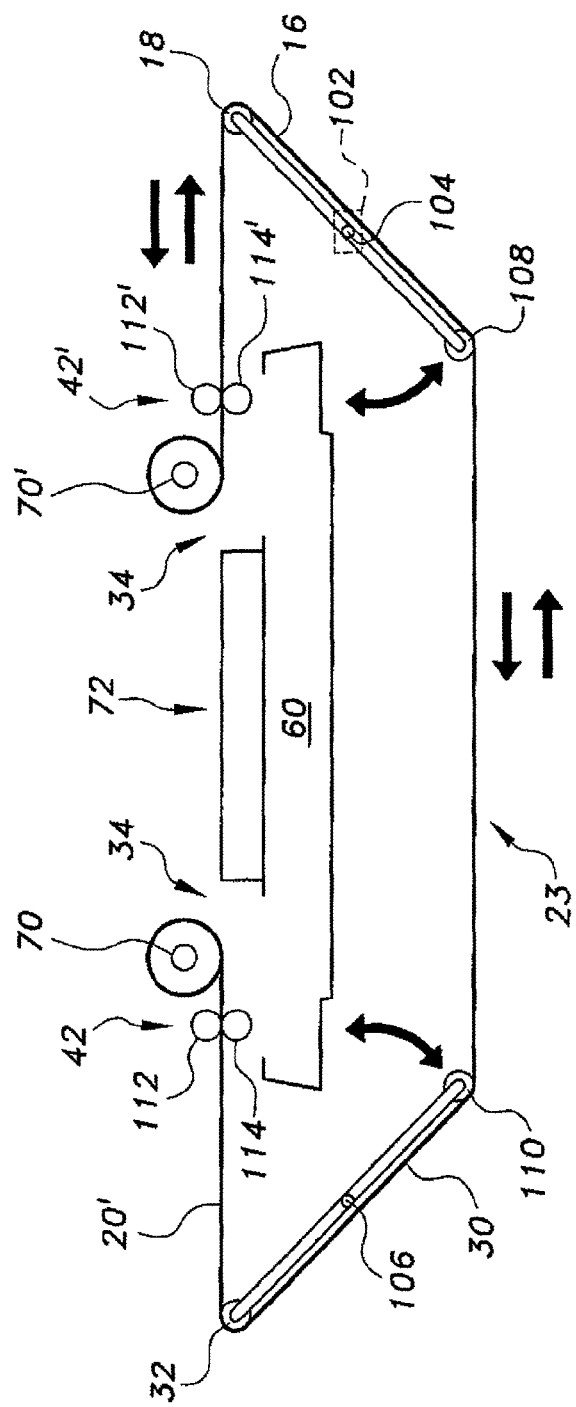

FIG. 4C is a diagrammatic side view of the roller belt system of the further embodiment of the oil recovery vessel of FIG. 2A.

Figure 5:
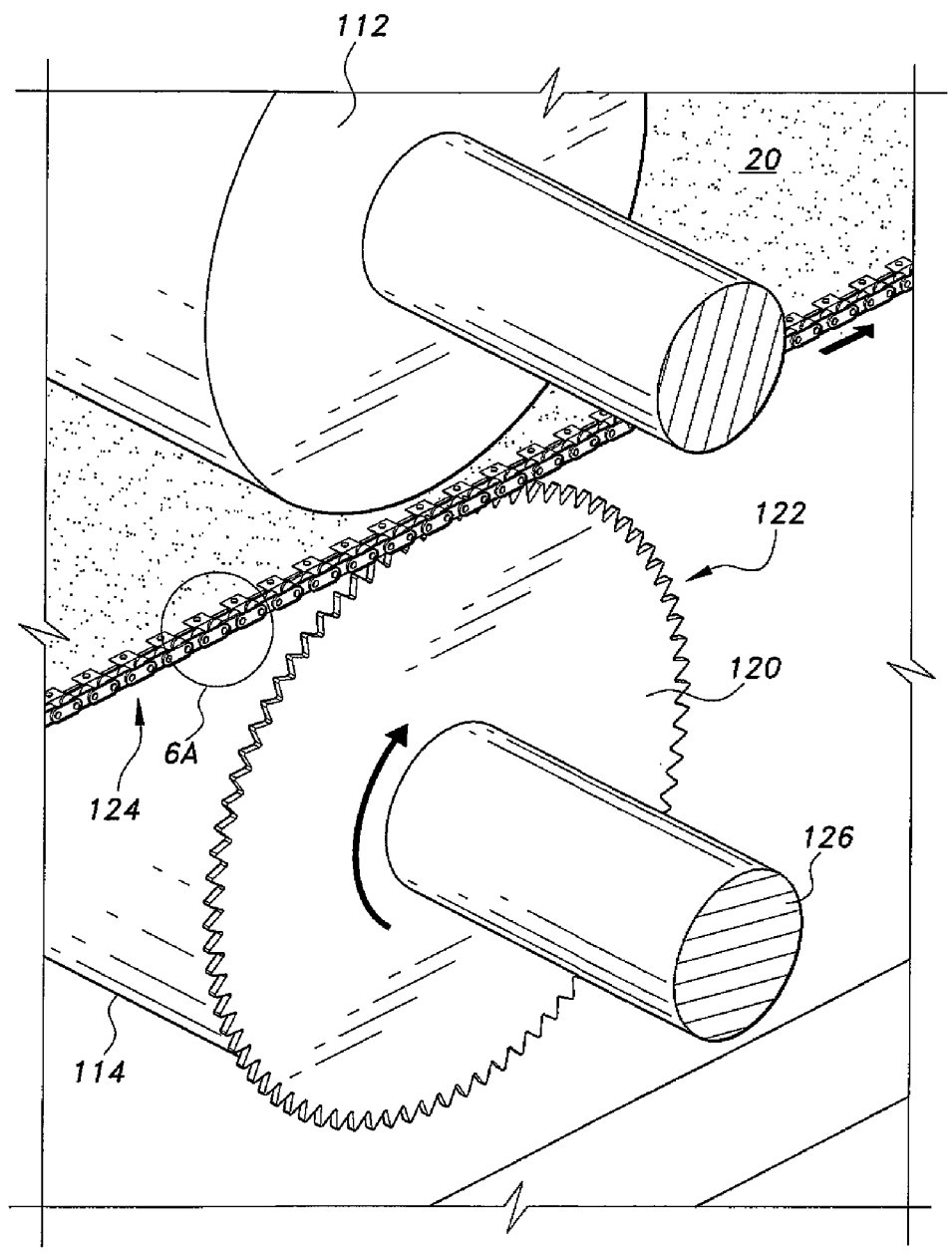

FIG. 5 is a partial perspective view of a chain and sprocket drive system for the roller belt system of the oil recovery vessel of FIG. 1.

Figure 6A:
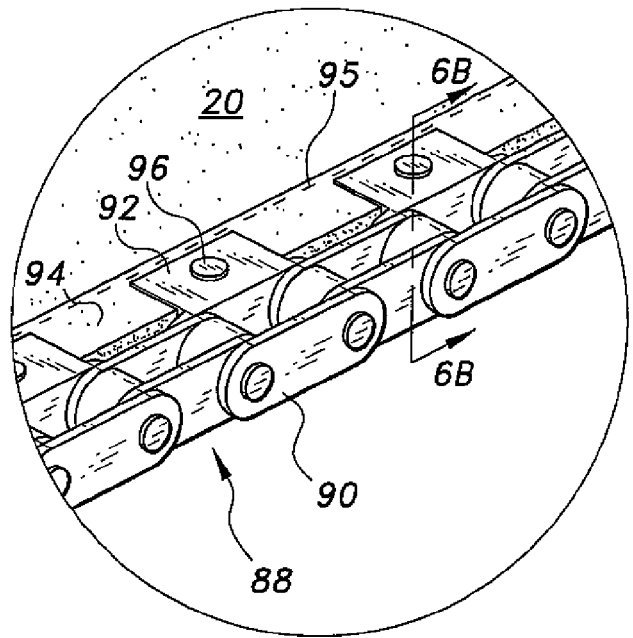

FIG. 6A in an enlarged view of section 6 in FIG. 5 showing details of the connection between the drive chain and the web.

Figure 6B:
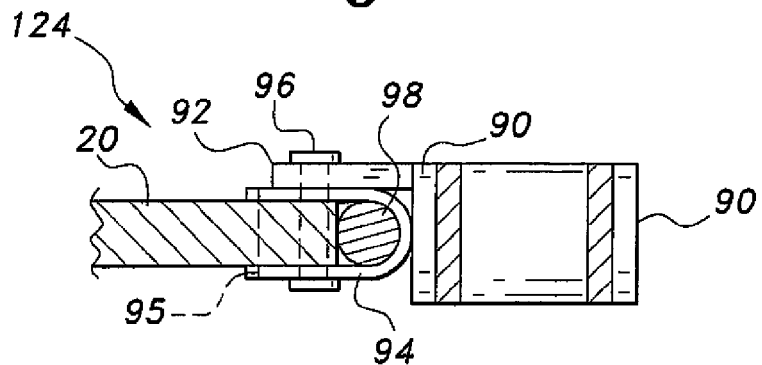

FIG. 6B is a cross sectional view through line 6B in FIG. 6A.

Figure 6C:
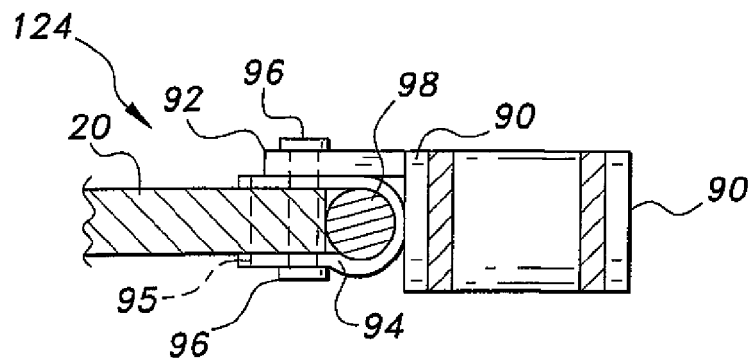

FIG. 6C in a cross sectional view of a further embodiment of the connection between the drive chain and the web.

Figure 7:
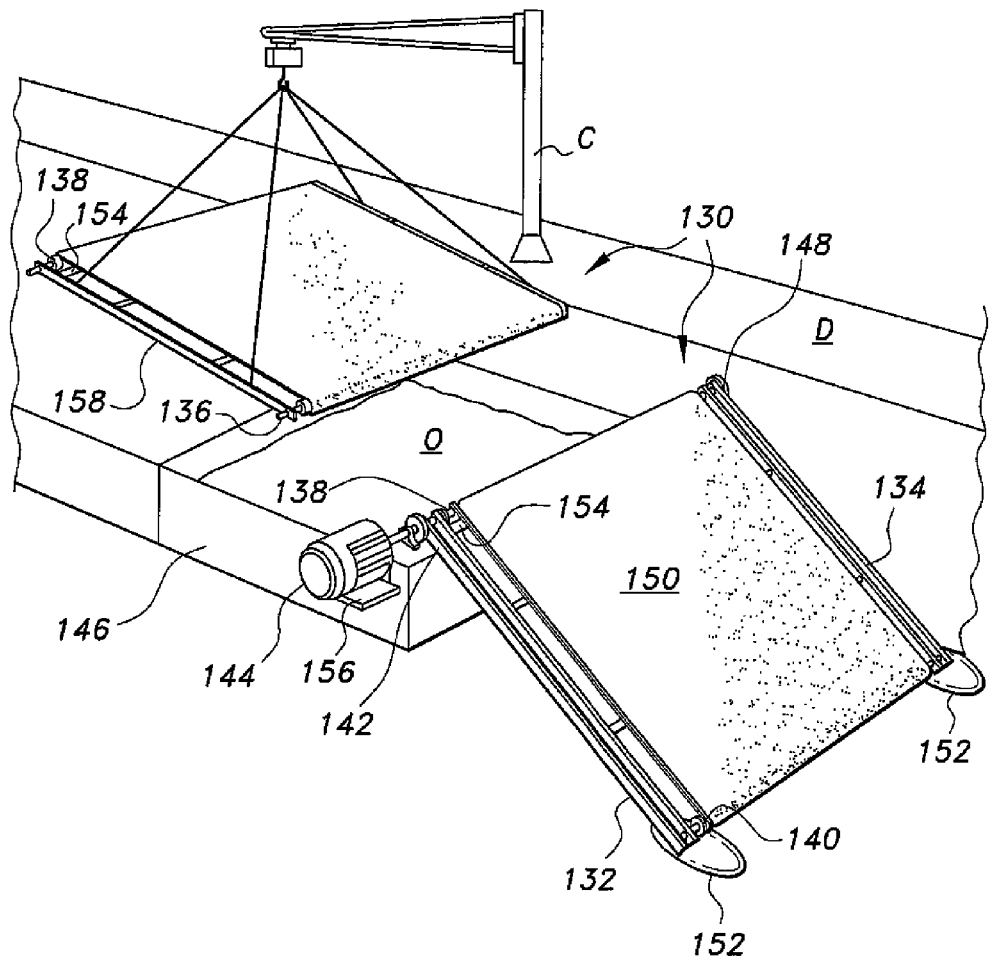

FIG. 7 is an environmental, perspective view of an oil recovery system according to the present invention.

Similar reference characters denote corresponding features consistently throughout the attached drawings.

DETAILED DESCRIPTION OF THE PREFERRED EMBODIMENTS

As best seen in FIG. 1, one embodiment of the oil recovery system includes an oil recovery vessel 10. The vessel 10 can be a catamaran for removing oil O from a body of water W. While a standard catamaran is shown, other types of catamarans may be used such as swath type catamarans that have hulls with a larger cross section under the water, for increased stability. As shown, the oil recovery vessel 10 includes starboard and port hulls 12, 14, respectively, which are spaced apart from one another, defining an open region 13 between the hulls. The hulls 12, 14 are connected to each other forward and aft by conventional catamaran frame members. An oil collection tank 60 is suspended from the frame members between the opposing hulls 12, 14, as best shown in FIGS. 4A-4C. The collection tank 60, as will be described in detail below, collects oil O recovered from water W. The starboard and port hulls 12, 14 provide buoyant flotation, as is conventional in catamarans and similar seafaring vessels. As shown in FIG. 1, the collection tank 60 may be covered with a deck 15, as is conventionally known in water vessels, including conventional railings 17, etc.

The vessel includes an oil recovery system positioned between opposing hulls 12 and 14. The oil recovery system includes a front frame 16 (FIG. 1) corresponding to a front portion of the vessel 10 and a rear frame 30 (FIG. 2) corresponding to a rear portion of the vessel 10. Front frame 16 rotatably supports an upper frame roller 18 and a submersible frame roller 108. Rear frame 30 rotatably supports an upper frame roller 32 and a submersible frame roller 110. As shown in FIGS. 4A and 4B, a belt 20 is rotatably supported by the upper and submersible frame rollers 18 and 108 of the front frame 16 and the upper and submersible frame rollers 32 and 110 of the rear frame 30. The belt 20 is continuous, i.e., does not include opposing end portions. The belt 20 may have a generally circular shape. The belt 20 covers or extends fully along an upper side 21 and a lower side 23 of the deck 15.

As indicated by the directional arrows in FIG. 1, the front frame 16 may be selectively pivoted to raise and lower the belt 20 in the open region 13 defined between the starboard and port hulls 12, 14. As best seen in FIGS. 4A and 4B, the front frame 16 is pivotally joined to crossbar 102 by a pivotal connector 104 that extends between starboard and port hulls 12, 14. The front frame 16 may be selectively raised and lowered by any suitable rotational drive system, such as hydraulic or pneumatic pistons or the like, for driving rotation about pivot 104.

Similarly, as best seen in FIGS. 2, FIGS. 4A, and 4B, the rear frame 30 is pivotally secured to inner walls of the starboard and port hulls 12, 14 by pivotal connector 106. As shown in FIGS. 4A and 4b, the front and rear rollers 18, 32 may be selectively raised and lowered with respect to the collection tank 60 by respective pivoting about pivotal connectors 102, 106 to selectively raise and lower the continuous belt 20 in and out of the water W, as will be described in further detail below.

The continuous belt 20 is formed from oil adsorbent fabric. The continuous belt 20 is mounted on the front and rear rollers 18, 32, respectively, such that one portion 21 of the continuous belt 20 is positioned above the collection tank 60 while another portion of the continuous belt 20 is positioned beneath the collection tank 60 in the open region 13. In other words, the continuous belt 20 is configured to rotate around the upper and lower sides of the collection tank 60. The continuous belt 20 is formed from a material that is both oil adsorbent and hydrophobic, such as a non-woven polypropylene multi-fiber fabric or the like.

As shown in FIG. 3, the belt 20 includes a pair of non-woven polypropylene multi-fiber fabric layers 50 preferably sandwich a central reinforcing net or scrim layer 52 in order to provide a degree of rigidity to the belt 20. The central reinforcing scrim layer 52 may be formed from any suitable material, such as polypropylene, polyethylene, fiberglass, metal or the like. The non-woven polypropylene material of the fabric layers 50 is oleophilic. The fabric layers 50 include non-woven polypropylene fibers which trap or absorb oil therebetween and repel or drive out water. The spacing in between the fibers as well as added additional perforations (not shown), aid in allowing the oil to enter the belt.

As shown in FIGS. 4A and 4B, when the front and rear frames 16, 30 are driven to rotate about respective pivots 104, 106, the submersible rollers 108, 110 are also elevated from the lowered, fully submerged state shown in FIG. 4A, in which a portion of belt 20 is deployed in water W to collect oil O, to the raised collapsed state shown in FIG. 4B, in which a portion of belt 20 is raised out of the water W when not in use.

As shown in FIG. 2, a one or more press rollers 42 are mounted on the upper deck 61 above the collection tank 60 for pressing against upper and lower surfaces of the continuous belt 20. Preferably, as best shown in FIGS. 4A and 4B, each roller press 42 includes an upper roller 112 and a lower roller 114. Each lower roller 114 is connected to a suitable motor or drive system for driving rotation thereof.

It should be understood that any desired number of press rollers may be utilized. In use, the front frame 16 and the rear frame 30 may be pivoted into the position shown in FIG. 4A, such that the continuous belt 20 may be selectively positioned within the oil layer O formed on water W for removing oil from the water. Any suitable drive system may be used to selectively drive rotation of the continuous belt 20, such that the oil adsorbent material of the belt 20 removes oil from within the open region 13. Through frictional engagement with the belt 20, the driven rotation of the lower rollers 114 drives rotation of the continuous belt 20. The type and capacity of the motor(s) used to drive lower rollers 114 may be varied, dependent upon the requirements of the specific application and the type or size of the vessel 10. It should be understood that any suitable type of linkages, such as drive chains, gears, belts or the like, may be used to interconnect the driving motor with lower rollers 114.

FIG. 5 illustrates one example of a drive system, wherein some of the rollers such as the lower rollers 114, have sprocket wheels 120 secured to either end thereof. Each sprocket wheel 120 is mounted to a respective axle 126, which is driven to rotate by a motor or other drive system. As shown, each sprocket wheel 120 has a toothed circumferential edge for engaging a chain attached to the side edge 124 of the continuous belt 20 to drive the continuous belt 20 forward. Further details of the chain and belt connection are described below with respect to FIGS. 6A-6C.

As the belt 20 is driven to rotate in a clockwise direction (in the orientation shown in FIG. 2 and as indicated by the directional arrows in FIGS. 4A and 4B), the roller presses 42 extract oil therefrom. A port 34 (FIG. 2) is formed in the upper deck 61 above the collection tank 60 for receiving the extracted oil. The port 34 may have a cover for selectively closing the tank. It should be understood that the collection tank 60 may include any suitable type of drainage pumps or the like to aid in the drainage of water or other unwanted fluids retained therein, and the collection tank 60 may be either permanently or removably attached to the frame of the catamaran. Further, it should be noted that the belt 20 is spaced apart from the lower wall of the collection tank 60 in the configuration of FIG. 4B to prevent interference therebetween.

As best seen in FIG. 1, a pair of sidewalls 24, 26, a rear wall 22 and a front wall 40 may each be mounted on the upper deck 61 to surround the port 34, thus limiting access to the port and preventing wind from affecting motion of the belt 20. An additional substantially C-shaped wall 41 may also be positioned proximate the front portion at the upper side 21 of the deck 15, as shown, defining a walkway 43 between walls 40, 41. Additionally, as shown in FIG. 2, one or more stabilizing rollers 62 may be rotatably mounted on the upper deck 61 for supporting and stabilizing the continuous belt 20. The roller 62 may include a drive roller instead of the roller press 42.

FIG. 2A and FIG. 4C show a further embodiment of the belt assembly of the oil recovery vessel 10 of FIG. 1. In this embodiment, the belt 20' is non-continuous, e.g., does not fully extend across the upper side 21 of the deck 15. One end of the belt 20' is attached to and wound on a first take-up/supply roller 70, while a second, opposing end of the belt 20' is attached to and wound on a second take-up/supply roller 70'. The first take-up/supply roller 70 and the second take-up/supply roller 70' are configured to alternately wind and unwind opposing portions of belt 20'. For example, when the first take-up/supply roller 70 unwinds or supplies a portion of the belt 20', the second take-up/supply roller winds or takes up an opposing portion of the belt, and vice versa. First and second roller presses 42, 42' are each adjacent a corresponding take-up/supply roller 70, 70'. In this embodiment, the upper deck 61 includes a central portion 72 and two openings 34 for accessing the tank 60. The central portion 72 provides a surface for cabins or other structures to be mounted midship. In addition, as a portion of the belt 20' that is wound on rollers 70 and 70' never contacts the water/oil, these portions help to clean the roller presses 42 and 42', thereby enhancing their ability to thoroughly remove the oil from the belt 20'. The remaining components of this embodiment operate as described for the embodiment shown in FIGS. 2 and 4A-4B.

FIG. 6A shows a portion of the belt 20 in FIG. 5, which has been enlarged to show the details of the connection between the chain 88 and the edge 124 of the belt 20. The chain 88 includes a plurality of flanges 92 extending from inwardly directed outer plates 90 of the chain 88, e.g., from outer plates 90 adjacent belt 20. The plurality of flanges 92 may be integrally connected to and/or normal to the inwardly directed outer plates 90 of the chain 88. It should be understood that chain 88 may be a single link-type chain as shown, or may be a double, triple or multiple chain with multiple side by side links, or may be a studded belt-type drive with flanges 92 connected thereto. As best seen in the cross sectional view of FIG. 6B, the edges of the belt 20 are wrapped in a reinforcing strip of material 94. Strip 94 is made of a material that is oil and waterproof, such as PVC. A reinforcing cord 98 is positioned at the edge of the belt 20 and is surrounded by the strip 94 to thereby hold it in place. Strip 94 may be glued and/or stitched to the belt 20 via stitches 95, for further reinforcement. The cord 98 may be a metal cable or a plastic material such as nylon, and may be a single strand or a multifilament cable. A pin 96 is inserted through each flange 92, reinforcing strip 94 and belt 20, to thereby hold the assembly together. The pins 96 include enlarged ends to keep the pin secured. The ends of the pins 96 may be bolt heads, nuts or other type fasteners, or may be simply be enlarged ends of the pins 96 formed by swaging the pins, similar to riveting.

FIG. 6C shows a further embodiment of the chain and belt connection. This embodiment is similar to the one shown in FIG. 6B, however a larger reinforcing cord 98' is used in place of cord 98. To accommodate the larger cord, strip 94' is wider to allow the strip 94' to completely surround cord 98' while still extending inwardly to engage the edge 124 of belt 20.

FIG. 7 shows a further embodiment 130 of the oil recovery system of the present invention. In this embodiment, the system 130 is a cartridge type roller assembly that can be removed and replaced should the belt 150 tear or rip loose from the drive chain or drive belt. The oil recovery system 130 can be detachably mounted to a shore-based support, as shown, or a movable vessel. As shown, a crane C is mounted on a nearby dock or other structure D, to assist in replacing the roller assembly. The oil recovery system 130 includes an upper roller 138 and a lower roller 140 rotatably mounted on a frame 158, which support a continuous belt 150 thereon. It should be understood that upper and lower rollers may be configured as take-up/supply rollers to facilitate movement of a non-continuous belt, as described previously. Extensions 136 are provided at opposing ends of upper roller 138 and/or lower roller 140 and detachably engage grooves 134 in a pair of side rails 132. The side rails 132 may be mounted to the shore-based support or movable vessel. Extensions 136 may serve to provide an axle for the lower roller 140 as well as support the frame 158.

The side rails 132 are rotatably mounted to chucks 148 at their upper end, and are supported by floats 152 at their lower end. The floats may be buoyant in water to facilitate contact between the belt 150 and the surface of the water W. Each assembly includes a third press roller 154 that presses against the upper roller 138 to squeeze the belt 150 therebetween, such that oil O is removed from the belt 150 and drains into tank 146. A motor 144 is supported on the tank 146 by platform 156 and drives chuck 148, which in turn drives the upper roller 138 and the belt 150. The chucks releasably hold the axle of the upper roller 138 in position, to provide support to dock D and to connect the motor 144 drive shaft to the axle of the upper roller 138.

The oil recovery system 130 can be used on docks or other shore or shallows based support, or it can be mounted on a road trailer, a boat or a ship. When used on a boat or ship, the assembly 130 can be mounted between the hulls of a catamaran, or may be used with other boat types including trimarans and single hull vessels.

It is to be understood that the present invention is not limited to the embodiments described above, but encompasses any and all embodiments within the scope of the following claims.

I claim:

1. An oil recovery system for removing an oil spill from the surface of a body of water, the system comprising:
   a frame;
   first and second frame rollers rotatably supported on the frame;
   a belt extending between the first and second rollers, the belt having a first layer of oleophilic material, a second layer of oleophilic material, and a third central reinforcing scrim layer between the first and second layers;
   a press roller including upper and lower rollers for pressing against opposing upper and lower surfaces of the belt to remove oil from the belt, at least one of the upper and lower rollers including a sprocket;
   a first chain extending along a first side edge of the belt, the chain being driven by the sprocket; and
   a connecting system to connect the first chain to the first side edge, the connecting system including
      a plurality of flanges extending from the first chain to the first side edge,
      a reinforcing cord adjacent the plurality of flanges and extending along the first side edge,
      a reinforcing strip wrapped around the reinforcing cord, the reinforcing strip attached to and extending along the side edge to connect the cord to the first, second, and third belt layers; and a plurality of pins, each one of the plurality of pins extending through a corresponding flange of the plurality of flanges, the reinforcing strip, and the first, second, and third belt layers.

2. The oil recovery system of claim 1, the system further comprising:
a second chain extending along a second side edge of the belt; and
a second connecting system to connect the second chain to the second side edge;
the second connecting system including a second plurality of flanges extending from the second chain to the second side edge;
a second reinforcing cord adjacent the second plurality of flanges and extending along the second side edge;
a second reinforcing strip wrapped around the second reinforcing cord, the reinforcing strip attached to and extending along the other side edge to connect the second cord to the first, second, and third belt layers; and
a second plurality of pins, each one of the plurality of pins extending through a corresponding flange of the second plurality of flanges, the second reinforcing strip and the first, second, and third belt layers.

3. The oil recovery system of claim 1, further comprising a tank for receiving the oil removed from the belt by the press roller.

4. The oil recovery system of claim 1, wherein the belt is continuous.

5. The oil recovery system of claim 1, wherein the first and second rollers are take-up/supply rollers, and the belt is non-continuous, having opposing end portions attached to the take-up/supply rollers.

6. The oil recovery system of claim 1, further comprising:
extensions protruding from the frame; and
first and second side rails, each side rail including a groove for detachably receiving the extensions to connect the frame to the side rails.

7. The oil recovery system of claim 6, further comprising a crane for removing and replacing the frame on the rails.

8. The oil recovery system of claim 6, wherein the side rails include upper and lower ends, the upper ends rotatably mounted to chucks and the lower ends connected to floats.

9. The oil recovery system of claim 1, wherein the system is mounted to a dock or other shore based support.

10. The oil recovery system of claim 1, wherein the system is mounted on a vessel.

11. An oil recovery vessel for removing an oil spill from the surface of a body of water, the vessel comprising:
a front frame and a rear frame;
a front frame roller rotatably supported on the front frame and a rear frame roller rotatably supported on the rear frame;
a belt extending between the front and rear rollers, the belt having a first layer of oleophilic material, a second layer of oleophilic material, and a third central reinforcing scrim layer between the first and second layers;
at least one press roller including upper and lower rollers for pressing against opposing upper and lower surfaces of the belt to remove oil from the belt, at least one of the upper and lower rollers including a sprocket for pressing against opposing surfaces of the belt to remove oil from the belt;
a first chain extending along a first side edge of the belt, the first chain being driven by the sprocket; and
a connecting connecting system to connect the first chain to the first side edge, the connecting system including
a plurality of flanges extending from the first chain to the first side edge;
a reinforcing cord adjacent the plurality of flanges and extending along the first side edge;
a reinforcing strip wrapped around the reinforcing cord, the reinforcing strip attached to and extending along the side edge to connect the cord to the first, second, and third belt layers; and
a plurality of pins, each one of the plurality of pins extending through a corresponding flange of the plurality of flanges, the reinforcing strip and the first, second, and third belt layers.

12. The oil recovery vessel of claim 11, the vessel further comprising:
a second sprocket;
a second chain extending along a second side edge of the belt; and
a second connecting system to connect the second chain to the second side edge;
the second connecting system including a second plurality of flanges extending from the second chain to the second side edge;
a second reinforcing cord adjacent the second plurality of flanges and extending along the second side edge;
a second reinforcing strip wrapped around the second reinforcing cord, the reinforcing strip attached to and extending along the other side edge to connect the second cord to the first, second, and third belt layers; and
a second plurality of pins, each one of the plurality of pins extending through a corresponding flange of the second plurality of flanges, the second reinforcing strip and the first, second, and third belt layers.

13. The oil recovery vessel of claim 11 further comprising a tank for receiving the oil removed from the belt by the roller press.

14. The oil recovery vessel of claim 13, the vessel further comprising port and starboard hulls and a crossbar extending between the port and starboard hulls, and wherein:
the tank is disposed between the hulls;
the front frame is pivotally attached to the crossbar;
the rear frame is pivotally attached to the port and starboard hulls;
the at least one roller press is mounted above the tank, so that oil pressed from the belt falls into the tank; and
the front and rear frames are selectively pivotal between a raised position raising the belt above the water, and a lowered position in which the belt is lowered onto or below the surface of the water to absorb the oil spill.

15. The oil recovery vessel of claim 11, wherein the belt is continuous.

16. The oil recovery vessel of claim 11, wherein the first and second rollers are take-up/supply rollers, and the belt is non-continuous, having opposing end portions attached to the take-up/supply rollers.

* * * * *